United States Patent [19]
Ehrler

[11] Patent Number: 5,791,288
[45] Date of Patent: Aug. 11, 1998

[54] HOUSE ANIMAL TOILET WITH AUTOMATIC SELF-CLEANING

[76] Inventor: Heinz-Dietger Ehrler, Steinastrasse 53, 79780 Stühlingen, Germany

[21] Appl. No.: 756,109

[22] Filed: Nov. 25, 1996

[51] Int. Cl.[6] ................................................. A01K 29/00
[52] U.S. Cl. .................................................... 119/163
[58] Field of Search ............................ 119/163, 165, 119/161, 162

[56] References Cited

U.S. PATENT DOCUMENTS

| | | | |
|---|---|---|---|
| 3,111,932 | 11/1963 | Knutson | 119/165 |
| 3,747,563 | 7/1973 | Brockhouse | 119/163 |
| 4,593,645 | 6/1986 | Dingler. | |
| 5,113,801 | 5/1992 | Rotstein et al. | |
| 5,458,090 | 10/1995 | Favreau | 119/163 |

*Primary Examiner*—Thomas Price
*Attorney, Agent, or Firm*—Panitch Schwarze Jacobs & Nadel, P.C.

[57] ABSTRACT

A pet toilet, especially a cat toilet, is provided with automatic self-cleaning. The pet toilet has a tub (1) which tub (1) has an electronic unit (11) in addition to a monitoring sensor (12) assigned to it, that in the tub (1) a reusable pet or cat litter comprising rust-free soft iron hollow bodies or acid-resistant, floatable plastic pellets with soft iron cores (10) is provided, that in the tub bottom area at least one electromagnet (9a, 9b) activable by the electronic unit is provided, that the monitoring sensor (12) activates the electronic unit (11) after use of the pet toilet by the pet, and that the electronic unit (11) for its part sets into motion the program for cleaning the tub (1), in which the reusable pet or cat litter is moved in the tub in an approximately horizontal direction and/or in an approximately vertical direction and/or is held fast on the tub bottom during the cleaning process by at least one electromagnet which can be moved on the tub bottom, or by means of plural electromagnets (9a, 9b) spaced at a distance from one another in the direction of motion and separately controllable.

10 Claims, 4 Drawing Sheets

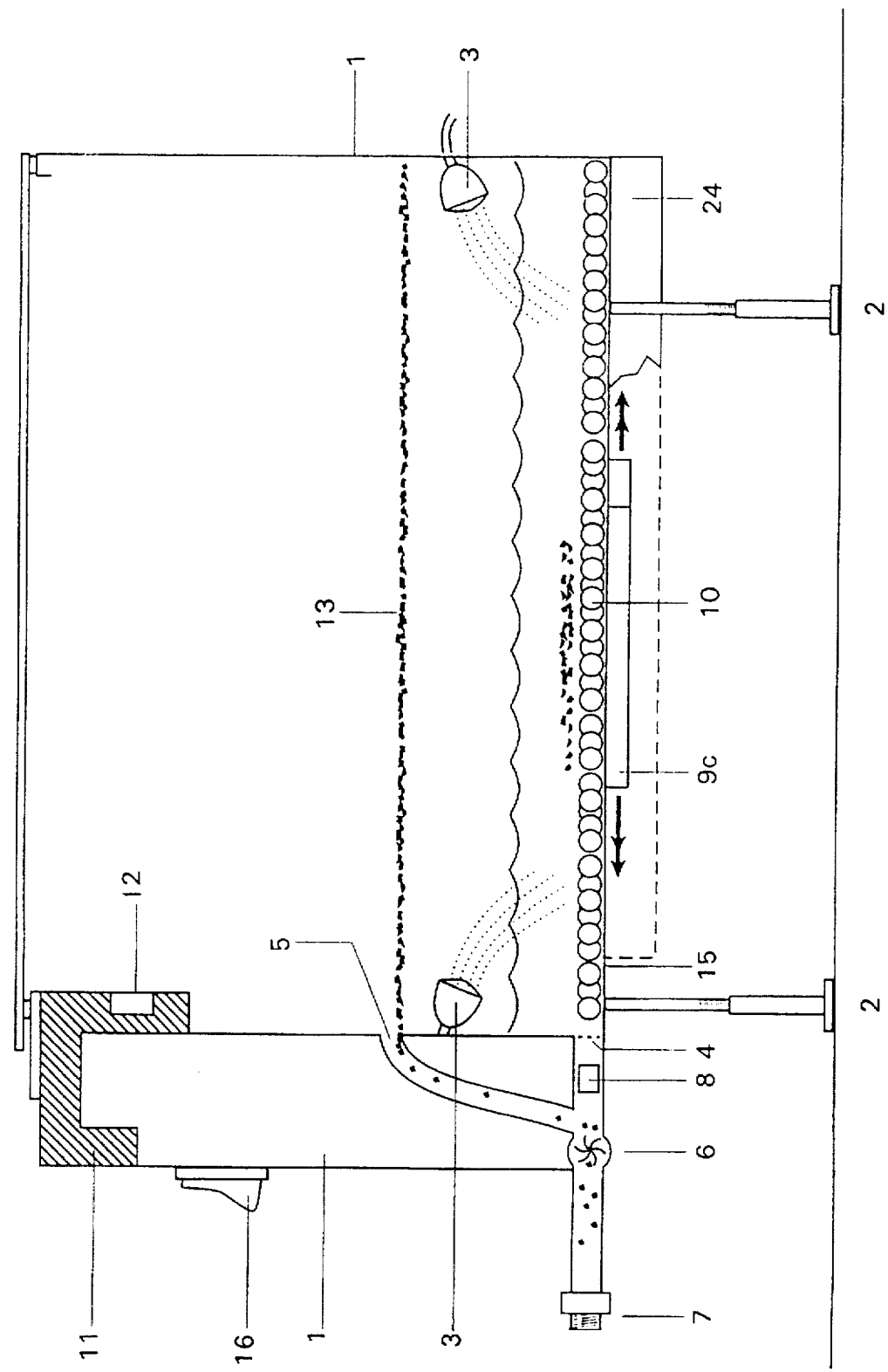

HOUSE ANIMAL TOILET WITH AUTOMATIC SELF-CLEANING

BACKGROUND OF THE INVENTION

The invention concerns a pet toilet, especially a cat toilet, with automatic self-cleaning.

When a cat is kept in a dwelling, one should make a cat toilet available for the cat. Frequently bowls or tubs or even low boxes are used as simple types of cat toilets, in which mostly a litter is scattered in the form of a layer of sand, sawdust or the like, in which the cat can deposit its excrement. These cat toilets, however, have great disadvantages. The excrement must either be removed from the litter with effort using a shovel and disposed of or be thrown away with the entire litter.

This is especially unhealthy above all when children live in the dwelling, who like to play with boxes in which the litter or the like is located. It is also disadvantageous that cat boxes or toilets spread a rather unpleasant odor.

A certain relief is obtained with cat toilets in which ones lifts out from time to time removable sieves. Then, the unused litter flows into the tub, while the litter clumped with excrement remains behind on the sieve.

The usual cat toilets all have the great disadvantage that cleaning the toilets consumes a great deal of time, and that a great deal of litter must be used, which is not cheap, and whose elimination can in addition pose a problem. Furthermore, it is a very time-consuming job to clean these cat toilets again.

According to a television report, an Austrian firm is supposed to have designed a cat toilet with automatic self-cleaning in the year 1994. This previously known cat toilet is monitored by a sensor with an electronic unit in order to dispense an exactly dosed portion of cat litter on a conveyor belt, which is allegedly sealed air tight in a bag after wetting and exchanged for a new portion of cat litter on the conveyor.

A tub-like cat toilet is already known from U.S. Pat. No. 4,593,645. The previously known cat toilet is subdivided by a partition, which serves as an overflow and whose upper wall section is constructed as a flap element. The tub floor therein is covered with a non-floating gravel approximately up to just below the flap valve. If the tub-like cat toilet is flushed to above the gravel with water, the excrement deposited by a cat on the gravel floats up and can be flushed away by opening the flap valve provided in the partition and be eliminated via a drain. The liquid left in the gravel can flow into the drain through a discharge opening in the tub floor, so that the previously known cat toilet is finally available in a largely cleaned state.

One has also already fashioned a cat toilet, which has a height-adjustable running grate in a tub. The running grate can be inclined as a function of the weight of a cat situated upon it and sprayed off with spraying nozzles located at the upper end of the running grate, so that the excrement deposited by the cat on the running grate can be conducted to a drain provided at the lower end of the running grate.

These previously known pet toilets are of comparatively expensive construction owing to the flaps and lifting mechanisms provided, without being able to eliminate with certainty excrement adhering to the gravel or the running grate or to exclude disturbing odors.

SUMMARY OF THE INVENTION

There thus exists the object of creating a pet toilet, especially a cat toilet, in which an automatic self-cleaning can be implemented in a relatively simple and uncomplicated manner, and disturbing odors can be excluded without the pet or cat litter having to be constantly procured and disposed of at some expense.

The solution of this objective in accordance with the invention with the pet toilet of the type mentioned at the beginning comprises in particular that the pet toilet has a tub, which tub is associated with an electronic unit along with a monitoring sensor, that a reusable pet or cat litter made of rust-free soft iron hollow bodies or of acid-resistant, floatable plastic pellets with soft iron cores is provided in the tub, that at least one electromagnet activatable through the electronics unit is provided in the area of the tub bottom, that the monitoring sensor activates the electronic unit after the pet has used the pet toilet, and that the electronic unit for its part sets into motion the program for cleaning the tub in which the reusable pet or cat litter is moved in the tub in an approximately horizontal direction and/or in an approximately vertical direction and/or held fast on the tub bottom during the cleaning process by at least one movable electromagnet or by means of plural separately controllable electromagnets set apart from one another in the direction of movement.

Additional features of the pet or cat toilet are presented in the dependent claims.

BRIEF DESCRIPTION OF THE DRAWINGS

The pet toilet is described in the following in the form of one embodiment.

Depicted are:

FIG. 4 shows a cat toilet with automatic self-cleaning in a schematic longitudinal section, which has a moveable electromagnet on the underside of its tub bottom.

DETAILED DESCRIPTION OF THE INVENTION

Figure 1:
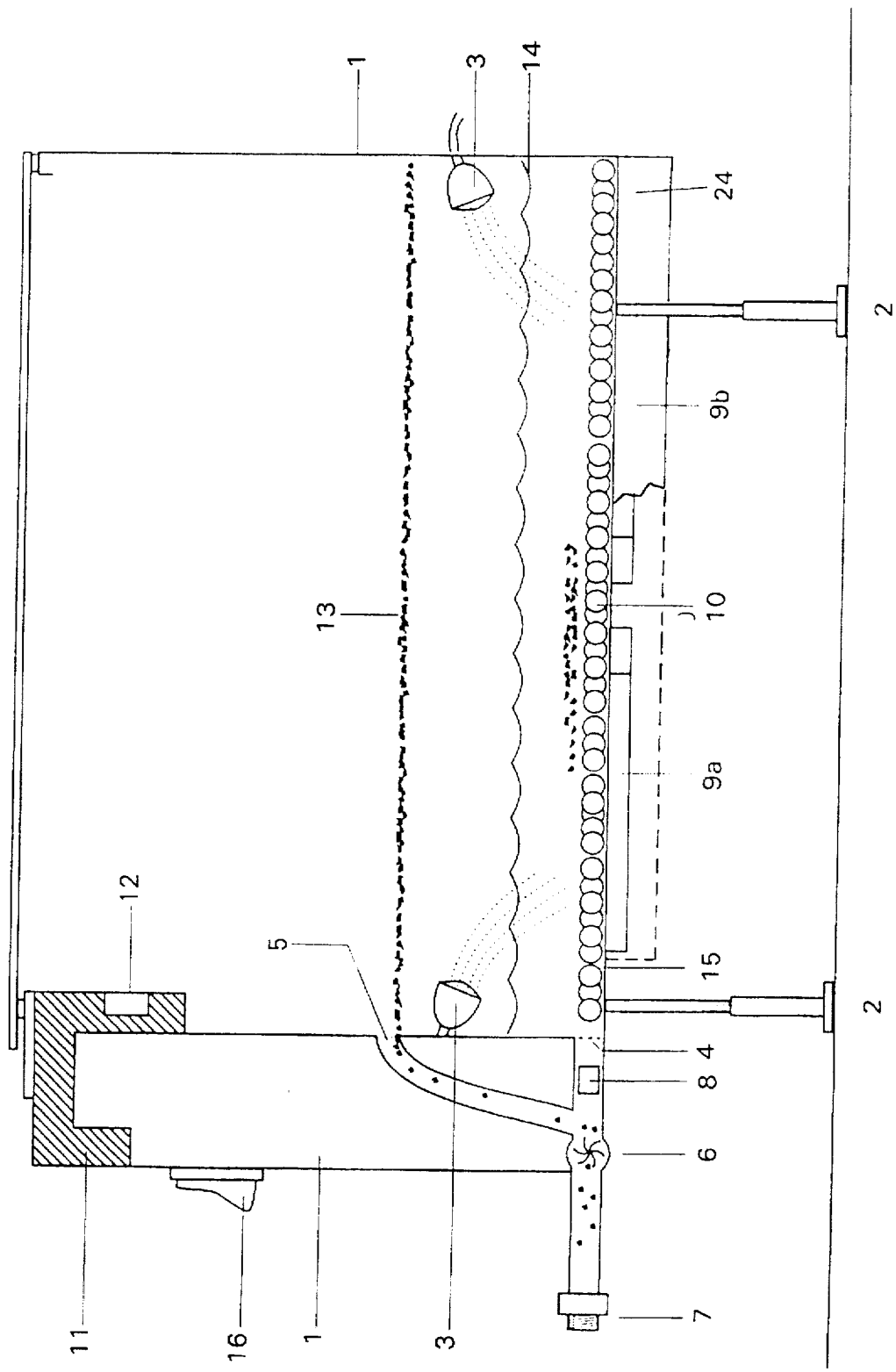
FIG. 1 shows a cat toilet with automatic self-cleaning in a schematic longitudinal section, which has two electromagnets on the underside of its tub bottom.

A plastic cat toilet with automatic self-cleaning is depicted in FIG. 1. The cat toilet has a tub 1 with height-adjustable feet 2 wherein at one end of this cat toilet a floor level water discharge 4 and a water overflow 5 at a height of about 7 cm are provided. A water supply 3 is provided on each of the two ends.

The tub 1 is filled with about 500 cc reusable cat litter 10. The cat litter comprises small, almost pea-sized hollow pellets of rust-free soft iron, or light, acid-resistant plastic floatable pellets with soft iron cores.

Two electromagnets 9a, 9b are installed on the underside of the tub bottom 15. FIG. 1 also shows an insulator covering 24 that covers at least one electromagnet which is mounted on the exterior of the tub bottom 15. The insulator covering 24 provides a damping effect to the electromagnetic field. Furthermore, an electronic unit 11 is provided which is assigned to the valve control 8, the monitoring sensor 12, the electromagnets 9a, 9b, the water supply 3, as well as to the pump 6. If the cat has now deposited its excrement in the tub 1 and left the tub 1, the monitoring sensor 12 gives the electronic unit 11 the command to undertake water supply 3 up to a water level of about 4 cm in height in the tub 1.

The cat litter pellets 10 will now float on the water surface 14 as a consequence of the natural buoyancy. At this time, the two electromagnets 9a and 9b are simultaneously activated (turned on and off) at short second intervals, and the cat litter is consequently drawn to the tub bottom 15 upon activation. When the electromagnets 9a, 9b are turned off, the cat litter 10 will rise to the top again due to buoyancy forces and consequently clean itself of its own accord of cat urine and feces. Following about 20 such cleaning cycles the cat litter 10 is held on the tub bottom 15 by continuous activation of the electromagnets 9a, 9b, in order to subsequently to reopen the water supply 3, so that the risen water with the feces 13 floating on the surface 14 can be sucked off using the operating waste water pump 6 and pumped off into the flushing basin or the washing machine connection 7.

After about 10 seconds, the water supply 3 is stopped and the magnetic valve 8 opens the previously closed outflow 4 located on the bottom.

The electromagnets 9a, 9b are now alternately activated, "a" on and "b" off and vice versa, that a rolling motion of the cat litter 10 arises on the tub bottom. At the same time, the water supply 3 is opened, and the cat litter 10 rolling on the bottom is sprayed in order to obtain a clean tub bottom as well as clean cat litter. Of course, the accumulating dirty water is pumped off at the same time. After shutting off the water, the cat litter 10 is still rolled on the tub bottom 15 for a while, in order to obtain a more rapid drying of the tub 1 as well as of the cat litter 10, whereby the device stands ready for further use by the cat.

In order to counteract loud noises which are caused by the rolling motion of the cat litter while the water is running off, an appropriate rubber lining is fitted into the bottom 15 of the tub 1, if necessary. To achieve a noise reduction, however, a sieve can also be provided, which is installed in the tub at a slight distance (for example 3 mm) above the tub bottom.

Figure 3:
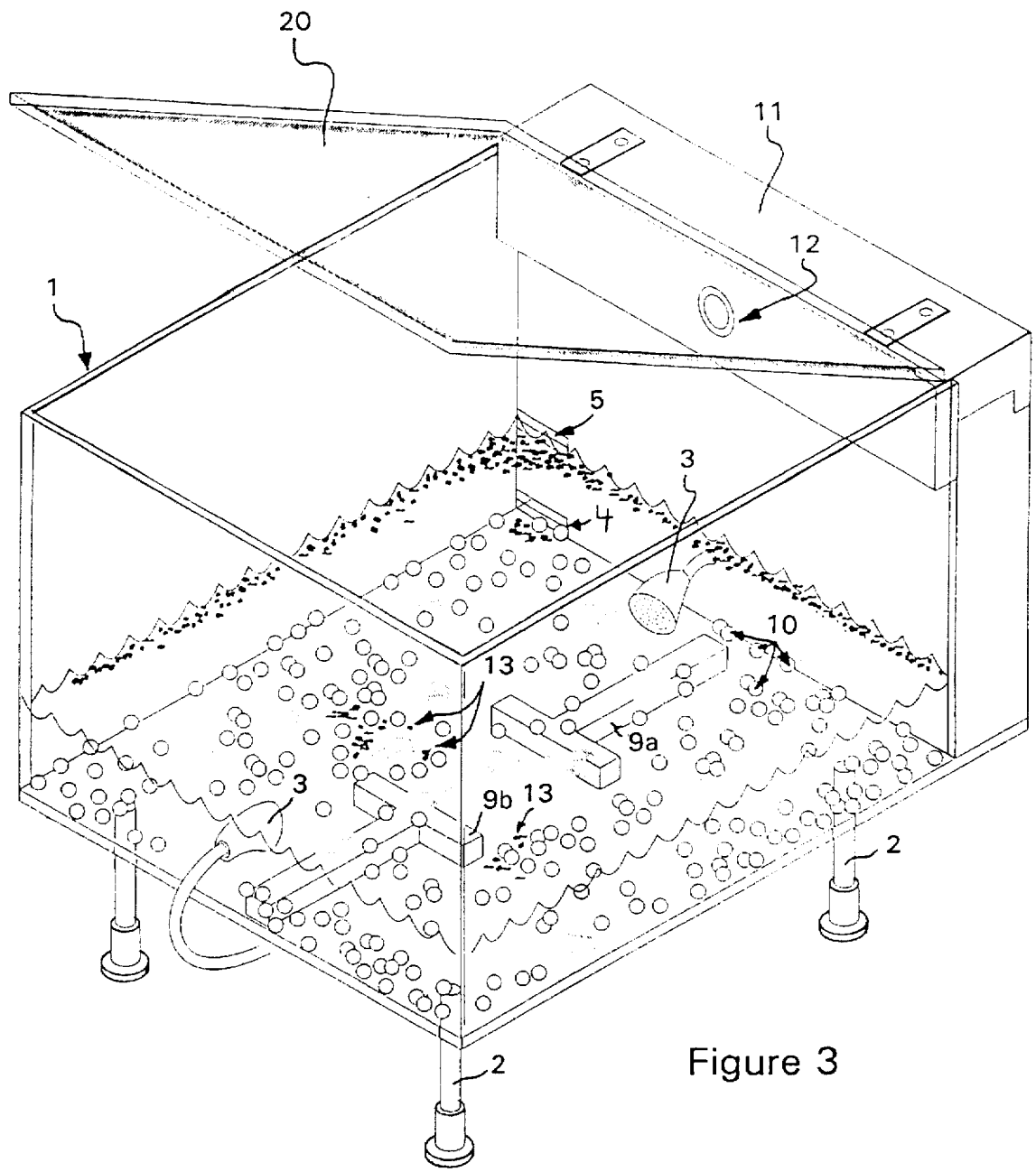
FIG. 3 shows a cat toilet, similar to that of FIGS. 1 and 2, in a perspective representation, but not to scale.

A cat toilet which has tub 1 with height-adjustable feet 2 is shown in perspective representation in FIG. 3. The water outflow 4 which lies on the floor as well as the water overflow 5 which is situated at distance above it is provided on one of the two ends of the tub 1. The sprinkler type water supplies 3 can be recognized on opposite ends.

Figure 2:
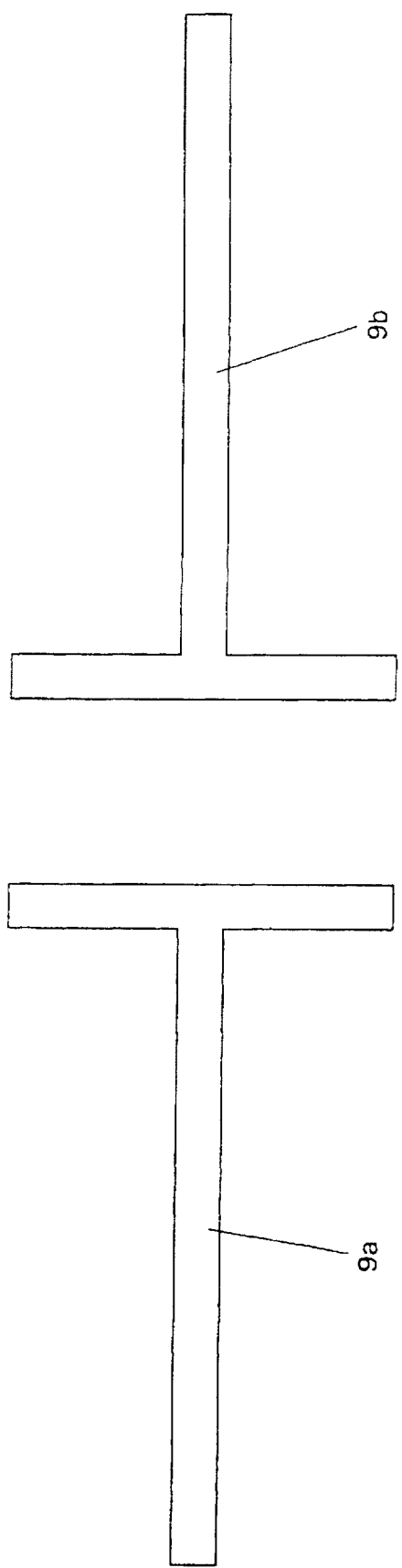
FIG. 2 shows the electromagnets of the cat toilet of FIG. 1 in a schematic elevation.

In FIG. 3, it is schematically shown that the cat litter can be moved in an approximately horizontal direction in the tub by means of the electromagnets 9a, 9b by activating the electromagnets alternately. Instead of two electromagnets set at a distance which can be separately controlled, one electromagnet can also be provided, for example, which can be driven underneath the bottom of the tub in the longitudinal direction of the tub, however. Just as this was already described in connection with FIGS. 1 and 2, the cat litter can also be moved in a vertical direction by drawing the cat litter floating on the surface of the water to the tub bottom at short second intervals by means of the electromagnets 9a, 9b. When the electromagnets 9a, 9b are turned off, the cat litter 10 will then rise up again as consequence of buoyancy forces and consequently cleanse itself of cat feces and urine.

In order to be able to close the opening of the tub 1, which is preferably is made of plastic, during and/or following conclusion of the cleaning process, the cat toilet depicted in FIG. 3 has a tub cover 20, which can be pivoted from an open to a closed position and vice versa by means of cover drive (not depicted here) preferably controlled by the electronic unit. In place of such a tub cover which is pivotably mounted at a side edge, a roller shutter which can be moved across the opening of the tub 1 can also be provided. FIG. 4 shows a cat toilet with automatic self cleaning wherein an electromagnet 9c that is movable on the tub bottom 15 during a cleaning cycle is provided.

In summary, the following can thus be stated:

After the deposit of the excrement by the cat and departure from the cat toilet, the presence and absence electronics 11, 12 give the impulse to open the water supplies 3 and to turn them off again after the water rises in the tub 1 to about 4 cm. The electromagnets 9 are now switched on and off in rapid succession about 20 times in second intervals. The cat litter 10, which floats on the water surface 13, is consequently in rapid succession drawn to the tub bottom 15 and driven back to the top again when the electromagnets 9 are shut off. In this manner, the cat litter 10 as well as the tub bottom 15 are rapidly and cleanly washed. The electromagnets 9 are now continuously activated for about 30 seconds, in order to hold the cat litter 10 on the floor of the tub. At the same time, the water supply valves 3 open, and the water rises up to the overflow 5. The waste water pump 6 now receives its starting impulse and pumps off the water on which the coarse excrements 13 are floating. At the same time, the closed magnetic valve 8 prevents water from flowing off at the lower outflow 4. After conclusion of floating the feces out, the magnetic valve 8 opens, and the waste water pump 6 can completely evacuate the tub 1. The cat litter 10 which is held on the tub bottom 15 by the electromagnets 9 is now brought into a rolling motion by renewed spraying with water and by alternatively turning the electromagnets 9 on and off, in order consequently to obtain a spotlessly clean tub 1 as well as cat litter 10. Of course, the waste water is immediately sucked off at the water discharge 4 when the waste water pump 6 operates at the same time that the magnetic valve 8 opens. The rolling movement of the cat litter 10 on the tub bottom 15 now continues for a few seconds more with the water supply turned off to obtain a rapid drying of the tub bottom 15 and the cat litter 10, and consequently makes the cat toilet ready for the next use.

The cat toilet here presented is distinguished by a comparatively simple, uncomplicated automatic cleaning, which makes it possible for the animal keeper, for example in the case of illness, to leave the animal by itself for several days upon providing it with sufficient dry feed and water, without being exposed to an unbearable stench upon returning home. Furthermore, with the exception of the waste water pump 6, no rotating mechanical parts, complicated coverings, etc., are necessary with the cat toilet presented here. This has as a consequence an increased safety for human and animal, a simple handling, lower production costs, and consequently a favorable economic utility.

I claim:

1. A pet toilet, especially for cats, with automatic self-cleaning, comprising a tub (1) provided with an electronic unit (11) and a monitoring sensor (12), a reusable pet litter (10) provided in the tub, said pet litter (10) comprising at least one of rust-free soft iron hollow bodies and acid-resistant, floatable plastic pellets with soft-iron cores, at least one electromagnet (9a, 9b) provided in an area of a tub bottom (15) and activatable by said electronic unit, the electronic unit (11) being activatable by the monitoring sensor (12) after use of the pet toilet by a pet, and the electronic unit serving to set in motion a program for cleaning the tub (1), the program causing the at least one electromagnet to effect at least one of the following operations during a cleaning cycle: movement of the litter in the tub in an approximately horizontal direction, movement of the litter in the tub in an approximately vertical direction, and holding the litter fast on the tub bottom.

2. The pet toilet according to claim 1, wherein the at least one electromagnet is movable on the tub bottom during a cleaning cycle.

3. The pet toilet according to claim 1, wherein the at least one electromagnet comprises plural electromagnets spaced at a distance from one another in a direction of motion, said electromagnets being separately controllable.

4. The pet toilet according to claim 3, wherein the electromagnets are alternately activatable for generating a rolling motion of the pet litter on the tub bottom.

5. The pet toilet according to claim 1, further comprising a waste water pump (6) for sucking out pet feces floating on a surface of water in the tub during continuous activation of the at least one electromagnet.

6. The pet toilet according to claim 1, further comprising height-adjustable feet for inclining the pet toilet in a direction of a liquid outflow (4).

7. The pet toilet according to claim 1, further comprising water supply spraying valves (3) provided on ends of the tub for conveying water into the tub (1) and for spraying the tub bottom and pet litter found thereon.

8. The pet toilet according to claim 1, wherein the tub (1) is provided with an overflow (5).

9. The pet toilet according to claim 1, wherein the electronic unit 11 controls magnetic valves (8) for a water supply (3) and water outflow (4) for the tub.

10. The pet toilet according to claim 1, wherein the at least one electromagnet is mounted on an exterior of the tub bottom (15) and is provided with an insulator covering for damping a force field of the electromagnet.

* * * * *